(12) United States Patent
Günther et al.

(10) Patent No.: US 7,651,799 B2
(45) Date of Patent: Jan. 26, 2010

(54) AIR HUMIDIFICATION FOR FUEL CELL APPLICATIONS

(75) Inventors: Detlef Günther, Mainz-Kastel (DE); Christian König, Dreieich (DE); John Ruhl, Rochester, NY (US)

(73) Assignee: GM Global Technology Operations, Inc.

( * ) Notice: Subject to any disclaimer, the term of this patent is extended or adjusted under 35 U.S.C. 154(b) by 827 days.

(21) Appl. No.: 11/018,661

(22) Filed: Dec. 20, 2004

(65) Prior Publication Data

US 2006/0134482 A1   Jun. 22, 2006

(51) Int. Cl.
  *H01M 8/00* (2006.01)
  *H01M 8/04* (2006.01)
  *H01M 8/18* (2006.01)
(52) U.S. Cl. ............................. 429/13; 429/12; 429/17; 429/20
(58) Field of Classification Search .................. 429/13, 429/12, 17, 20
See application file for complete search history.

(56) References Cited

U.S. PATENT DOCUMENTS

| | | | |
|---|---|---|---|
| 5,645,950 A | * | 7/1997 | Benz et al. ..................... 429/13 |
| 5,786,104 A | * | 7/1998 | Black et al. .................... 429/13 |
| 6,440,595 B1 | | 8/2002 | Herdeg et al. |
| 2001/0009306 A1 | * | 7/2001 | Shimanuki et al. .......... 261/104 |
| 2003/0170516 A1 | | 9/2003 | Gilbert |

OTHER PUBLICATIONS

Smithsonian Institute, http://americanhistory.si.edu/fuelcells/basics.htm, 2001.*
http://www.cityrating.com/averagetemperature.asp.*

* cited by examiner

*Primary Examiner*—Patrick Ryan
*Assistant Examiner*—Helen O Conley
(74) *Attorney, Agent, or Firm*—Harness, Dickey & Pierce, P.L.C.

(57) ABSTRACT

A system and method for improving air humidification for fuel cell applications includes a fuel cell stack having a cathode inlet and a cathode outlet. The cathode inlet receives an oxidant. A humidifier humidifies the oxidant prior to delivery of the oxidant to the cathode inlet. An injection nozzle is provided, and a volume of water substantially vaporized by the injection nozzle reduces a temperature of the oxidant and increases a water transfer rate of the humidifier. The injection nozzle can be positioned either directly upstream of the humidifier in the oxidant inlet line or in a stack cathode outlet line which is directed into the humidifier.

10 Claims, 5 Drawing Sheets

AIR HUMIDIFICATION FOR FUEL CELL APPLICATIONS

FIELD OF THE INVENTION

The present invention relates in general to fuel cell humidification systems and more specifically to a system and method for use to control the cathode inlet humidity of a fuel cell stack.

BACKGROUND OF THE INVENTION

Fuel cell systems frequently include a plurality of fuel cells assembled together to form a fuel cell stack. Proton Exchange Membrane (PEM) type fuel cells normally include an anode, a cathode and a membrane separating the anode and cathode. Each of the anodes of the individual fuel cells are both electrically and fluidly connected together such that the plurality of anodes are commonly referred to as the anode side of the fuel cell stack. Similarly, each of the cathodes of the individual fuel cells are both electrically and fluidly connected together and commonly referred to as the cathode side of the fuel cell stack. The anode side of the fuel cell stack includes an inlet for a fuel and an outlet for the non-consumed fuel and for exhaust gases which are created at the anode side and exhausted from the fuel cell stack. The cathode side of the fuel cell stack also includes an inlet normally used to inject a gaseous oxidizing agent such as air and an outlet used to exhaust gases which are produced at the cathode side. A compressor is commonly connected upstream of the cathode side inlet of the fuel cell stack to pressurize the gaseous oxidizing agent prior to injection.

The membranes of the individual fuel cells must be kept moist during operation of the fuel cell stack to protect the membranes from damage and to achieve the highest degree of fuel cell stack operating efficiency. During operation of a fuel cell stack, protons which originate from a hydrogen component of the fuel supplied to the anode side migrate through the humidified membranes and react at the cathode side with the oxidizing agent. The oxidizing agent is normally in the form of atmospheric oxygen. The hydrogen and oxygen combine to generate electrical power and also produce a volume of water. Water is therefore always present at the cathode side. A portion of this water during normal operation of the fuel cell stack diffuses back through the membranes of each fuel cell to the anode side of the fuel cell stack so that both sides of the membrane and both the anode and cathode sides are normally humidified. The water produced is often in excess of that required for normal humidification of the fuel cell stack, therefore an excess portion of the water is normally removed from the anode side and the cathode side and either collected for re-use or drained off.

Adequate humidification control of the fuel cell stack cannot always be maintained, however. During certain operating conditions the atmospheric air normally used for the oxidizing agent does not contain sufficient water volume and the cathode side of the fuel cells can therefore be inadequately humidified. To resolve this, common fuel cell stacks provide active humidification control of the cathode gas flow. A common form of humidification control involves the use of a humidifier upstream of the fuel cell stack which is separately supplied by a water source such as a tank. Water for these humidifiers is also commonly provided from fuel cell product water transferred from the exhaust of the fuel cell stack to the stack cathode inlet. Because water is being injected, to prevent direct impingement of water particles on the fuel cell membranes, the fluid volume is first preheated to entirely vaporize it. This additional process step increases the cost and complexity of the system. Proper flow control of the water injected into the fuel cell stack is also required which is commonly provided through the use of flow nozzles or pressure control valves. These components also increase system cost and complexity.

Humidifiers used at the stack cathode inlet are commonly of the membrane type. Membrane type humidifiers generally provide optimal efficiency at air inlet humidities of approximately 100% relative humidity (RH) plus a portion of liquid water. However, if the humidity at the humidifier inlet drops below 100% RH the efficiency of the humidifier will drop significantly. One solution to this problem is to increase the size of the humidifier, however this solution increases the component cost of the humidifier and can result in further configuration problems for the system. A lower cost and simpler solution is therefore desirable.

SUMMARY OF THE INVENTION

According to a preferred embodiment of the present invention, improved air humidification for fuel cell applications includes a fuel cell stack air humidification system which includes a fuel cell stack having a cathode inlet and a cathode outlet. The cathode inlet is operable to receive an oxidant into the fuel cell stack. A humidifier is operable to humidify the oxidant prior to delivery of the oxidant to the cathode inlet. An injection nozzle is also provided, wherein a volume of water substantially vaporized by the injection nozzle is operable to reduce a temperature of the oxidant and increase a water transfer rate of the humidifier.

According to another preferred embodiment of the present invention, a method for controlling air humidification in a fuel cell system is provided, the fuel cell system including a fuel cell stack, a humidifier adapted to humidify an oxidant injected in the fuel cell stack, and an injection nozzle. The method includes: connecting the injection nozzle in a flow path including the humidifier and the fuel cell stack; vaporizing a water volume using the water injection nozzle; and cooling the oxidant with the vaporized water volume prior to the oxidant being injected into the fuel cell stack.

According to another aspect of the present invention, a method for using a vaporized water volume to reduce the temperature of an oxidant injected into a fuel cell system is provided. The fuel cell system includes a fuel cell stack, a humidifier adapted to humidify the oxidant, and at least one injection nozzle connectable into a fuel cell stack cathode exhaust stream. The method includes: connecting the humidifier to a cathode inlet of the fuel cell stack; operating the humidifier to humidify the oxidant during a steady operating state of the fuel cell stack; supplying the injection nozzle with a water volume directable into the fuel cell stack cathode exhaust stream upstream of the humidifier; vaporizing the water volume using the injection nozzle; and cooling the oxidant using the vaporized water volume to increase a relative humidity of the oxidant exiting the humidifier.

Further areas of applicability of the present invention will become apparent from the detailed description provided hereinafter. It should be understood that the detailed description and specific examples, while indicating a preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
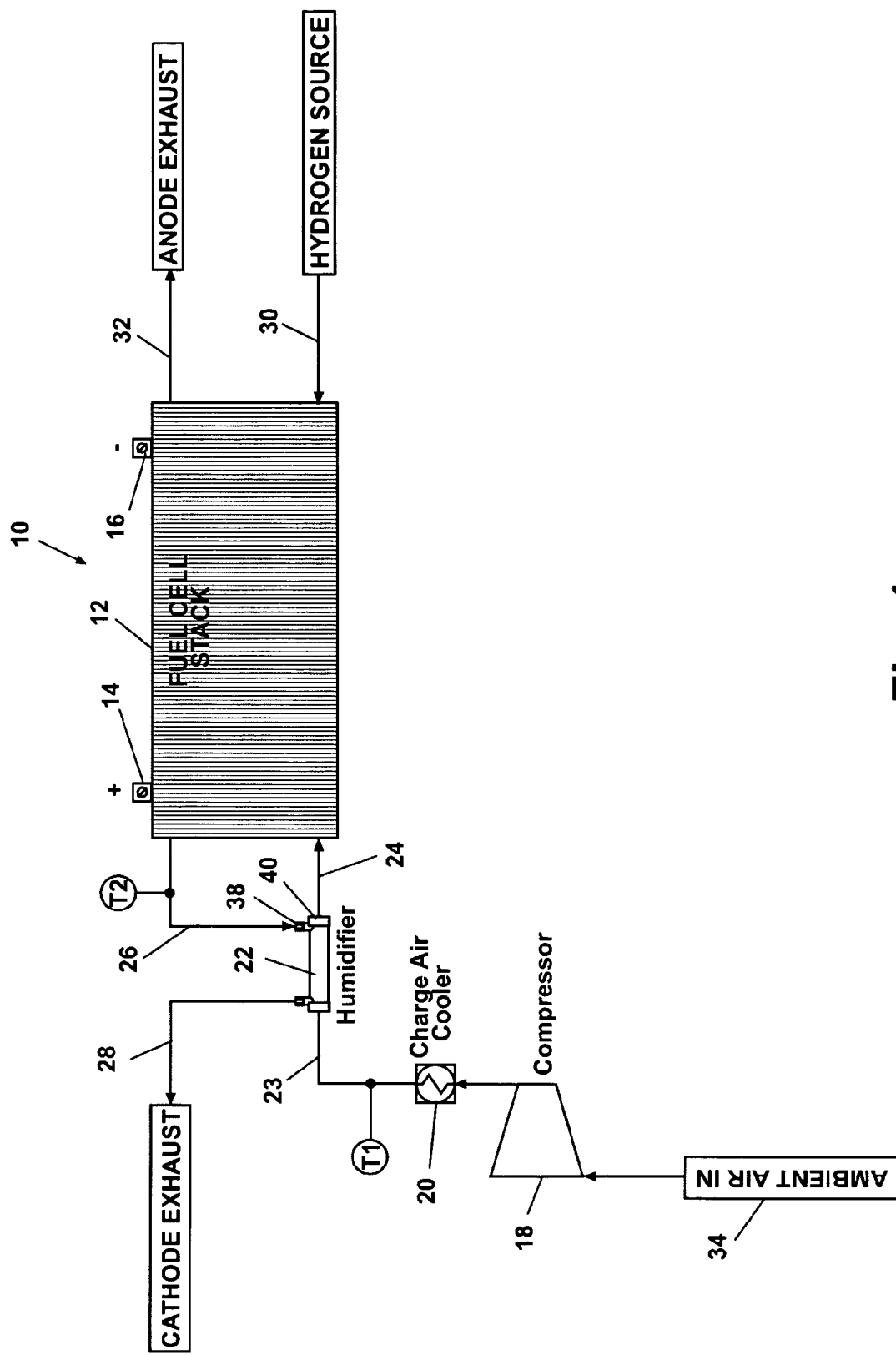
FIG. 1 is a flow diagram identifying the various components used in a system for improved air humidification for fuel cell applications of the present invention.

According to a preferred embodiment of the present invention and referring generally to FIG. 1, an air humidification system 10 includes a fuel cell stack 12 having electrical connections 14 and 16. Ambient air providing a source of oxygen to the cathode side of the cells of the fuel cell stack 12 is compressed using a compressor 18. Compressed air discharging from compressor 18 is subsequently cooled by a charge air cooler 20. The cooled air discharging from charge air cooler 20 is received in a humidifier 22 via a humidifier inlet line 23. The compressed and humidified air is discharged from humidifier 22 into the individual cathode sides of each cell of fuel cell stack 12 via a humidifier outlet line 24 that communicates with a cathode inlet manifold as is known in the art. A cathode air/water outlet line 26 collects the discharge from the various cathode sides of the fuel cells of fuel cell stack 12 and returns this humidified air to humidifier 22. A cathode exhaust line 28 is provided to discharge cathode exhaust products from humidifier 22 and thereby from fuel cell stack 12. A hydrogen source inlet line 30 and an anode exhaust line 32 are shown connected to the anode inlet and outlet manifolds of the fuel cell stack 12. An oxidant (for example air) from an oxidant source 34 is transferred via humidifier inlet line 23 to humidifier 22. The flow in cathode air/water outlet line 26 enters a humidifier cathode influent connection 38. The humidified oxidant exiting humidifier 22 is discharged into humidifier outlet line 24 at a humidifier cathode feed connection 40.

Compressor 18 and charge air cooler 20 are generally known in the art and will therefore not be further discussed herein. Humidifier 22 can be any type of humidifier used for fuel cell applications. By way of example only, humidifier 22 is shown and described as a membrane type humidifier operable at approximately fuel cell stack 12 operating temperatures. The term "operating temperature" therefore broadly refers to the various fluid and ambient conditions which fuel cell stack 12 is operating in. For purposes of this discussion, the oxidant (for example air) injected into the cathode side of fuel cell stack 12 via humidifier inlet line 23 can have an "operating temperature" ranging from below 0° Celsius to approximately 80° Celsius, however this range is provided for example only and can be higher or lower depending on the fuel cell stack design.

During a steady state operating condition of fuel cell stack 12, a relative humidity of the oxidant transferred to fuel cell stack 12 via humidifier outlet line 24 should be at a predetermined relative humidity and in one preferred embodiment a relative humidity of approximately 50% is preferred. For determining relative humidity a reference temperature is also necessary. The reference temperature can be measured for example at a location T1.

It has been observed that the relative humidity of the oxidant flow through humidifier outlet line 24 feeding fuel cell stack 12 during normal operating conditions can reach as low as 20% to 30% relative humidity. Operation of air humidification system 10 at this low relative humidity can damage the fuel cells of fuel cell stack 12. Known systems for increasing the relative humidity to the desired 50% relative humidity range include connecting an additional water source upstream of fuel cell stack 12 which is preheated and pressurized for insertion. The operation of pressurizing and preheating this water source increases cost and complexity for the system.

It has been found that the Cathode oxidant gas relative humidity can be increased from the observed 20% to 30% relative humidity range up to the desired 50% relative humidity range by reducing the temperature of the oxidant by approximately 5° to 10° Celsius prior to injection into fuel cell stack 12. In one preferred embodiment of the present invention, the 5° to 10° Celsius temperature reduction is achieved by directly injecting a small amount of vaporized water upstream of fuel cell stack 12. The water transfer rate of humidifier 22 is thereby increased such that the oxidant relative humidity reaches the desired 50% relative humidity. Two exemplary injection locations or points for direct injection are shown in FIG. 1 at locations T-1 and T-2.

Injection location T-1 is located between charge air cooler 20 and humidifier 22 in humidifier inlet line 23. Injection location T-2 is located between fuel cell stack 12 and humidifier 22 in cathode air/water outlet line 26. By injecting a small amount of vaporized water directly at either injection location T-1 or T-2, the need to preheat the injected fluid is eliminated. Injection of small volumes or amounts of approximately ambient temperature vaporized water at either of injection locations T-1 or T-2 effectively reduces cathode side inlet flow temperature and increases the relative humidity of the oxidant flow from humidifier 22 via humidifier outlet line 24 without the need for an additional air cooler or increasing the size of humidifier 22, which would increase the cost and complexity of the overall fuel cell system.

Figure 2:
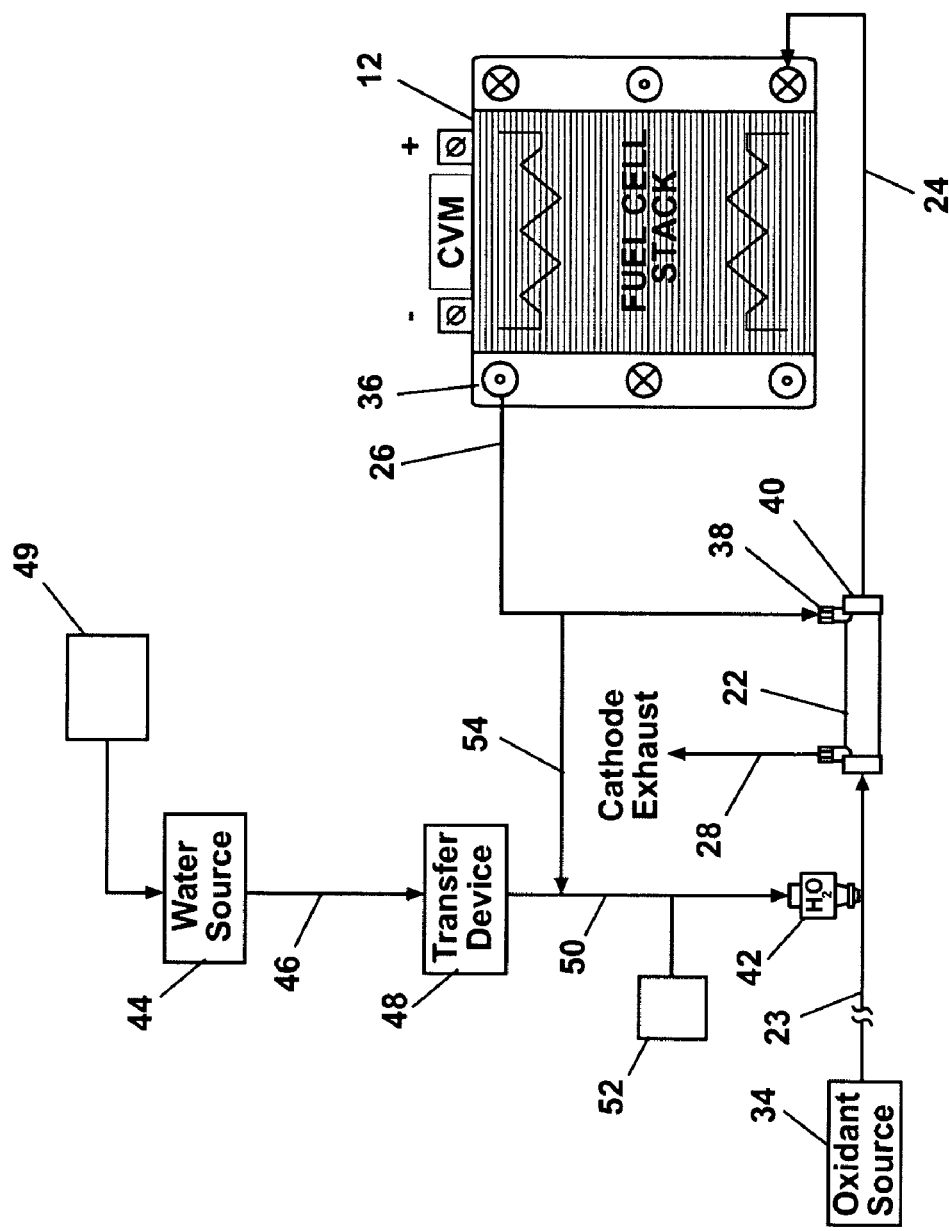
FIG. 2 is a flow diagram modified from FIG. 1 to identify exemplary flow paths for a first preferred location of a water injection nozzle operable to vaporize a water volume which reduces a temperature of the oxidant gas.

Referring specifically to FIG. 2, water injection via injection location T-1 is more fully detailed. According to this aspect of the present invention, a first injection nozzle 42 is directly connected into humidifier inlet line 23. First injection nozzle 42 is used to atomize a volume of the water from a water source 44 for injection into humidifier inlet line 23. It is preferable to atomize essentially all of the water injected into humidifier inlet line 23 to reduce the potential for water droplet carryover and impingement in humidifier 22. Atomization also maximizes the subsequent cooling effect of the water volume injected via first injection nozzle 42.

First injection nozzle 42 is connected to humidifier inlet line 23. First injection nozzle 42 is also connected to and fed by an approximately ambient temperature water source 44. Water source 44 can be any type of water source such as an outside water supply or an effluent tank which collects moisture discharged from fuel cell stack 12. From water source 44, water is transferred via water transfer line 46 using a water transfer device 48. Water transfer device 48 can be any type of transfer device known in the art such as a pump. Water transfer can also be accomplished using an fluid pressurization system 49 directly connected to water source 44. The configuration shown in FIG. 2 is therefore exemplary of a plurality of water transfer systems. Water transfer device 48 (or fluid pressurization system 49) also provides any necessary pressure increase of the supply water to a predetermined pressure necessary to permit injection using first injection nozzle 42. The predetermined pressure will vary for different designs of fuel cell stack 12. Using water transfer device 48 the fluid is transferred via a nozzle feed line 50 to first injection nozzle 42.

A measuring device 52 is optionally connected into nozzle feed line 50. Because water is being directly injected into the cathode supply line in this aspect of the present invention, the total amount of water injected requires careful control. Measuring device 52 therefore can be provided to permit more accurate control of the total water flow into humidifier inlet line 23. FIG. 2 also identifies a cross-connect line 54 which can optionally be used to supply at least a portion of the water for first injection nozzle 42. A cross-connect line 54 connects cathode air/water outlet line 26 to first nozzle feed line 50. This permits the approximately 100% relative humidity air and any water discharged from fuel cell stack 12 to be used to supplement or replace the water from water source 44. A control or throttling valve (not shown) can also be included in cross-connect line 54 to isolate or throttle the amount of flow via cross-connect line 54 to first nozzle feed line 50.

Figure 3:
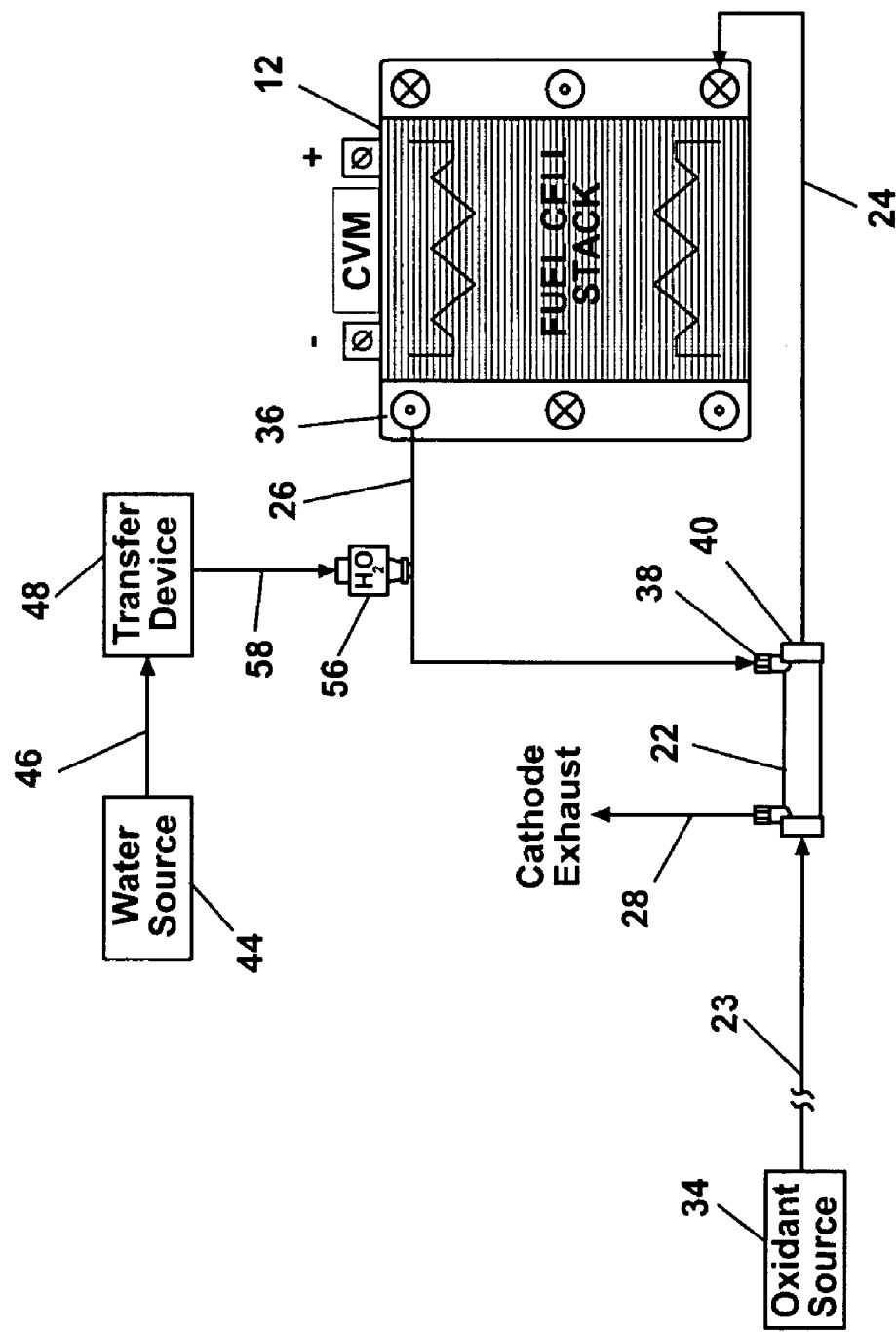
FIG. 3 is a flow diagram similar to FIG. 2, showing a second preferred location of a water injection nozzle operable to vaporize a water volume which reduces a temperature of the oxidant gas.

Referring now generally to FIG. 3, and according to another preferred embodiment of the present invention, fluid injection at injection location T-2 of FIG. 1 is more fully detailed. The oxidant (for example air) from oxidant source 34 is transferred via humidifier inlet line 23 to humidifier 22. Cathode gas discharge from fuel cell stack 12 which is normally at approximately 100% relative humidity is received by humidifier 22 via cathode air/water outlet line 26 at humidifier cathode influent connection 38. The cathode gas discharge at approximately 100% RH is used by humidifier 22 to humidify the oxidant from oxidant source 34 prior to transfer via humidifier outlet line 24 into fuel cell stack 12.

Water source 44, water transfer line 46 and water transfer device 48 are similar to that shown and described in FIG. 2 and will therefore not be further described herein. Using water transfer device 48, the water from water source 44 is transferred to a second injection nozzle 56 via a second nozzle feed line 58. Cathode effluent discharged from cathode discharge side 36 of fuel cell stack 12 is desirably cooled by the approximately ambient temperature atomized water flow directed into cathode air/water outlet line 26 via second injection nozzle 56 by approximately 5° to 10° Celsius. This cooled flow enters humidifier cathode influent connection 38 and subsequently cools the oxidant discharged from humidifier 22 via humidifier cathode feed connection 40 which increases the relative humidity of the oxidant to approximately 50% RH.

A benefit of injecting water via second injection nozzle 56 is that the cooling effect of the injected water is realized without the injected fluid being directly combined with the oxidant flow exiting humidifier 22. This minimizes the chance of water droplet carryover to fuel cell stack 12. The maximum volume of water injected via second injection nozzle 56 is therefore not critical once a minimum flow is established. Any excess water flow through second injection nozzle 56 is discharged via cathode exhaust line 28. A flow measuring device to measure the flow rate of water supplied to second injection nozzle 56 is therefore not required for this aspect of the invention.

The purpose of injecting atomized water via either first or second injection nozzles 42, 56 is to reduce the temperature of the oxidant upstream of fuel cell stack 12 by approximately 5° to 10° Celsius. It has been found that a temperature change of approximately 5° to 10° Celsius increases the relative humidity of the oxidant (air) in humidifier outlet line 24 from approximately 20% to approximately 50% relative humidity which is desired for normal operation of fuel cell stack 12. This 5° to 10° Celsius cooling effect is achieved using water from water source 44 of approximately ambient temperature and/or from cross-connect line 54. The temperature of the water directed to either first or second injection nozzles 42, 56 provides the desired cooling effect at water source 44 temperatures up to approximately 80° Celsius.

Figure 4:
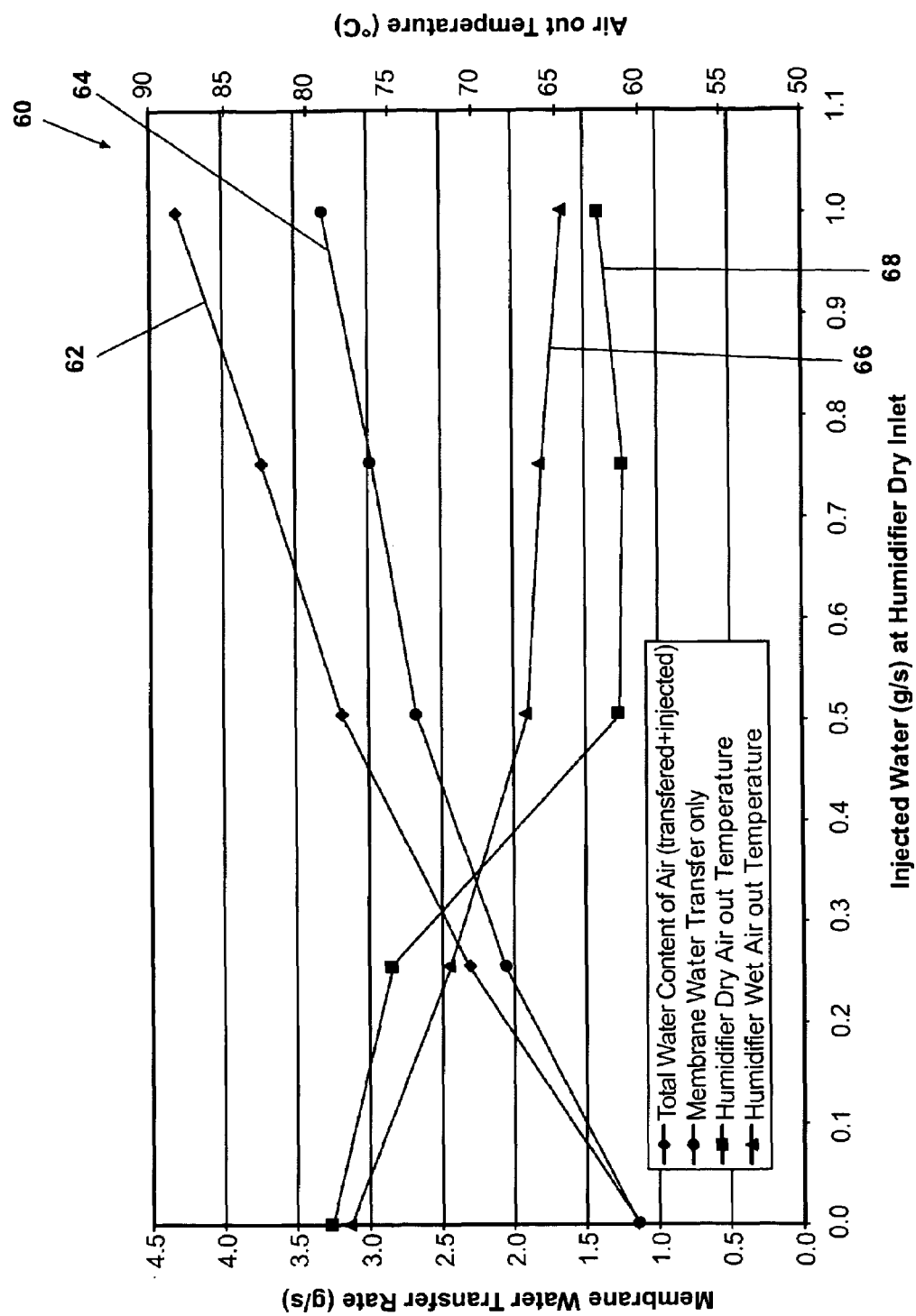
FIG. 4 is a graph identifying the influence of additional injected water at the humidifier dry inlet (T1) on the membrane water transfer rate of a system of the present invention.

Referring next to FIG. 4, a graph 60 identifying the influence of additional injected water at the dry inlet of the humidifier on the membrane water transfer rate of an exemplary humidifier 22 is shown. FIG. 4 shows a membrane water transfer rate measured in grams per second discharged from humidifier 22 as an additional amount of water is injected via first injection nozzles 42 in air humidification system 10. The temperature decrease of the dry and the wet outlet of the humidifier 22 which results from injecting water via first injection nozzles 42 is also identified to the right in FIG. 4. Graph 60 identifies a total water content of the humidifier exhaust air curve 62, a membrane water transfer rate curve 64, a humidifier wet air outlet temperature curve 66 and a humidifier dry air outlet temperature curve 68. The assumptions for first graph 60 are that fuel cell stack 12 is operating at normal or steady state operating conditions. Humidifier wet air outlet temperature curve 66 is provided by measuring the wet air temperature at the outlet of humidifier 22. The humidifier dry air outlet temperature curve 68 is provided by measuring the dry air outlet temperature of humidifier 22.

During steady state operation of fuel cell stack 12, in one exemplary embodiment of the present invention a membrane water transfer rate from humidifier 22 is required to be approximately 2.3 grams per second in order to maintain approximately 50% relative humidity at the inlet or cathode supply to fuel cell stack 12. Without additional water injection, humidifier 22 provides a membrane water transfer rate of approximately 1.2 grams per second. As shown in FIG. 4, by reducing either the wet air outlet temperature or the dry air outlet temperature by approximately 5° to 10° Celsius, the membrane water transfer rate of humidifier 22 is increased from approximately 1.2 to the required 2.3 grams per second. This is achieved by injecting water via either first or second injection nozzles 42, 56 at a rate of approximately 0.25 grams per second. It is therefore evident that injecting a relatively small amount of ambient temperature water via either first or second injection nozzles 42, 56 of the present invention significantly increases the membrane water transfer rate of humidifier 22. This cooling effect achieved by using injected ambient temperature water achieves the desired membrane water transfer rate without the addition of additional pre-heat components or increasing the size of humidifier 22 of the fuel cell arrangement.

Figure 5:
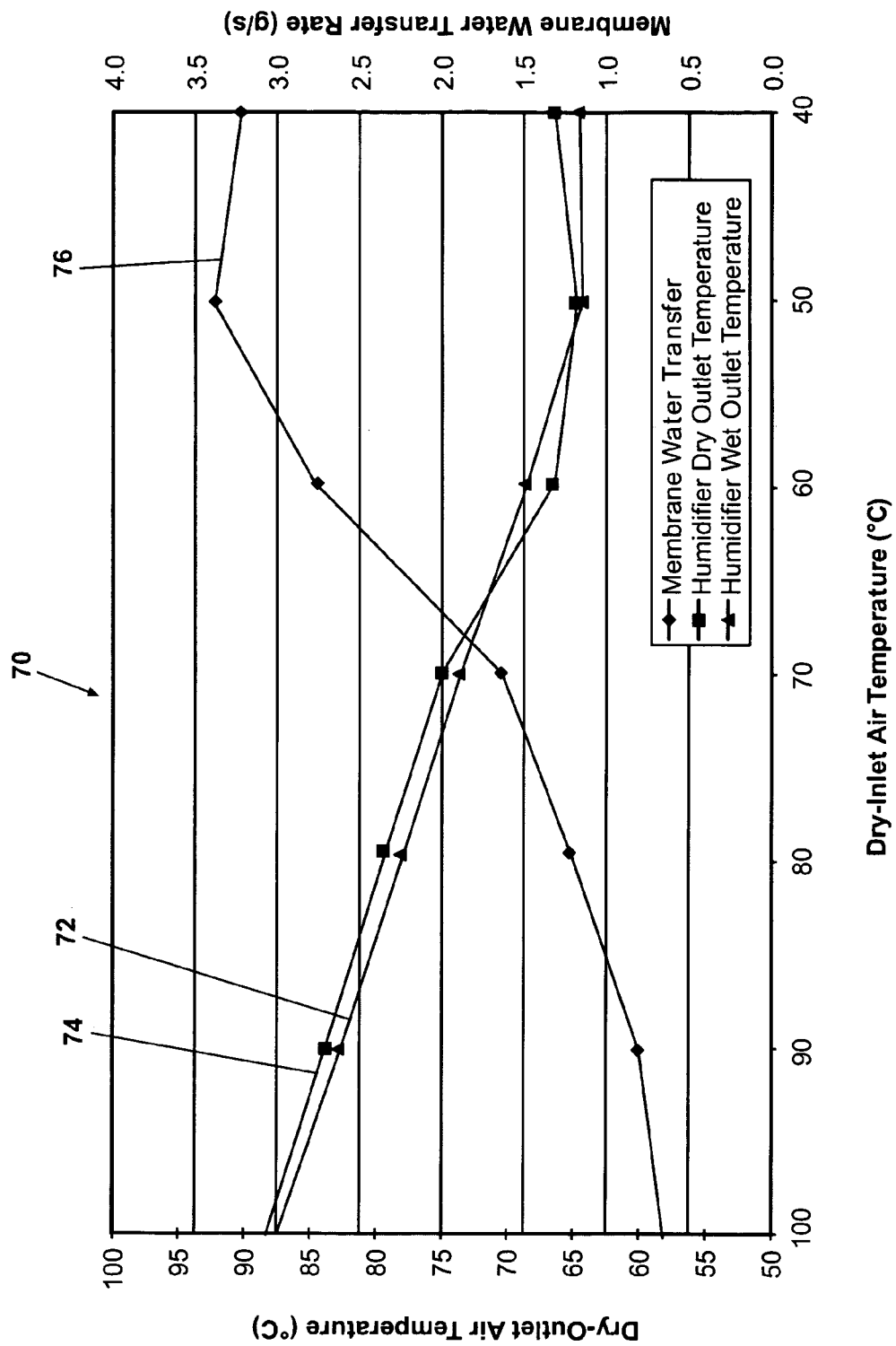
FIG. 5 is a graph identifying the influence of humidifier dry air inlet temperatures on the membrane water transfer rate for a system of the present invention.

Referring next to FIG. 5, a second graph 70 identifies the influence of the air inlet temperature on the membrane water transfer rate of humidifier 22. Second graph 70 identifies a wet air outlet temperature curve 72, a dry air outlet temperature curve 74, and a water transfer rate curve 76. As clearly seen in second graph 66, the water transfer rate identified by water transfer rate curve 76 is highest when the humidifier "dry" air inlet temperature and the humidifier "wet" air inlet temperature are lowest. This effect is achieved by injecting water using the air humidification system of the present invention.

First and second injection nozzles 42, 56 can be selected from any commercially available spray injection/atomization nozzles known in the art. An example of atomization nozzles suitable for this purpose are available from E.R.L. Limited of Brighton, England. It is desirable to completely atomize the amount of water injected into either humidifier inlet line 23 or cathode air/water outlet line 26. The selected size and design of either first or second injection nozzle 42, 56 is therefore based on the total amount of water to be injected, which can vary from fuel cell stack design to design. For example only, the size of first or second injection nozzle 42 or 56 described for use in reference to FIGS. 4 and 5 is capable of water flow rates ranging between approximately 0.1 grams/second to approximately 1.1 grams/second.

An air humidification system 10 of the present invention offers several advantages. By injecting relatively small amounts of water directly into either the cathode inlet stream of a fuel cell stack or into the cathode effluent stream of the fuel cell stack, a water transfer rate of an associated humidifier can be increased. By atomizing and injecting the small amount of water into these paths, the temperature on the inlet side of the fuel cell stack cathode supply line is reduced which improves the humidifier water transfer rate. The use of injection nozzles of the present invention allows substantially ambient temperature water which is normally available to fuel cell stacks to be injected into the cathode flow stream or to contact the cathode flow stream without the need to initially heat the water. This reduces the total cost and system impact of the fuel cell stack. By positioning injection nozzles according to the present invention, the relative humidity of the cathode source to a fuel cell stack can be maintained during steady state operation of the fuel cell stack. The use of injection nozzles of the present invention is effective for increasing the relative humidity of any type of humidifier used in fuel cell stack operation. A temperature decrease of approximately 5° to 10° Celsius is provided by injecting water using the injection nozzles positioned per the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell stack air humidification system, comprising:
a fuel cell stack having a cathode inlet connected to a source of an oxidant feeding the fuel cell stack and a cathode air/water outlet;
a compressor to compress and inject a volume of the oxidant into the fuel cell stack;
a humidifier humidifying the volume of the oxidant to approximately 20 to 30 percent relative humidity prior to delivery of the volume of the oxidant to the cathode inlet, the humidifier including a cathode influent connection connected to the cathode air and/or water outlet by a cathode air and/or water outlet line;
a charge air cooler positioned downstream of the compressor and upstream of the humidifier, the charge air cooler cooling the volume of oxidant discharged from the compressor prior to injection into the humidifier;
a source containing ambient temperature water connected to an inlet line to the humidifier;
a cross-connect line connecting the cathode air and/or water outlet line to the feed line;
an injection nozzle connected into the inlet line to receive, vaporize and inject the ambient temperature water and cathode gas discharged via the cathode air and/or water outlet line, reducing a temperature of the oxidant by 5 to 10 degrees Celsius;
injection of the ambient temperature water via the injection nozzle increasing a water transfer rate of the humidifier and increasing the relative humidity of the oxidant discharged from the humidifier to 50 percent.

2. The system of claim 1, further comprising:
an inlet line directly connecting the source containing ambient temperature water to the humidifier; and
a measuring device connected to the water transfer line measuring a volume of the ambient temperature water injected through the injection nozzle.

3. A fuel cell stack air humidification system, comprising:
a fuel cell stack having a cathode inlet and a cathode air and/or water outlet, the cathode inlet receiving an oxidant into the fuel cell stack;
a humidifier having an inlet line, the humidifier receiving and humidifying the oxidant prior to delivery of the oxidant to the cathode inlet;
a source containing ambient temperature water connected feed line to the inlet line of the humidifier;
a cross-connect line connecting the cathode air and/or water outlet to the feed line;
an injection nozzle directly connected into the inlet line, wherein the injection nozzle receives the ambient temperature water from the source and a cathode gas discharge from the cathode air/water outlet and vaporizes and injects the ambient temperature water and the cathode gas discharge into the inlet line, the ambient temperature water reducing a temperature of the oxidant discharged by the humidifier by 5 to 10 degrees Celsius;
wherein injection of the ambient temperature water via the injection nozzle increases a water transfer rate of the humidifier; and
wherein the humidifier provides a water transfer rate of 1.2 grams per second at a steady state operation.

4. The system of claim 3, wherein at a flow rate of the injection nozzle of 0.25 grams per second the water transfer rate of the humidifier is increased to 2.3 grams per second.

5. A fuel cell stack air humidification system, comprising:
a fuel cell stack having a cathode inlet line and a cathode air and/or water outlet line;
a humidifier having:
a cathode influent connection connected to the cathode air/water outlet line; and
an inlet line connected to a source of an oxidant feeding the fuel cell stack, and an outlet line connected to the cathode inlet line; and
an injection nozzle in communication with an ambient temperature water source and discharging water from the water source directly into the cathode air/water outlet line to mix with a cathode effluent discharged from the fuel cell stack in the cathode air and/or water outlet line, using the approximately ambient temperature water injected into the cathode air and/or water outlet line via the injection nozzle cooling the cathode effluent by approximately 5° to 10° Celsius and increasing a relative humidity of the oxidant in the humidifier outlet line from approximately 20% to 30% to approximately 50% relative humidity.

6. The system of claim 5, wherein the humidifier comprises a membrane humidifier wherein a water transfer rate of the humidifier is measured in grams per second discharged from the humidifier.

7. The system of claim 5, further comprising:
a transfer device transferring the water from the ambient temperature water source directly to the injection nozzle.

8. The system of claim 5, wherein the injection nozzle provides an injection flow rate of approximately 0.25 grams per second.

9. The system of claim 5, wherein the fuel cell stack comprises a plurality of proton exchange membranes.

10. The system of claim 5, wherein the ambient temperature water has a temperature ranging between 0° Celsius to 80° Celsius.

* * * * *